United States Patent [19]

Hillegass

[11] 4,151,345

[45] Apr. 24, 1979

[54] METHOD OF MAKING POLYURETHANE UTILIZING NICKEL ACETYLACETONATE

[75] Inventor: Donald V. Hillegass, Alliance, Ohio

[73] Assignee: The Goodyear Tire & Rubber Company, Akron, Ohio

[21] Appl. No.: 842,719

[22] Filed: Oct. 17, 1977

Related U.S. Application Data

[63] Continuation-in-part of Ser. No. 724,890, Sep. 20, 1976, abandoned.

[51] Int. Cl.$^2$ ................. C08G 18/22; C08G 18/14; C08G 18/62
[52] U.S. Cl. .................................... 528/56; 521/124; 521/170; 528/75
[58] Field of Search ................. 260/2.5 AB, 77.5 AB, 260/75 NB, 77.5 CR; 528/56, 75; 521/124, 170

[56] References Cited

U.S. PATENT DOCUMENTS

| | | |
|---|---|---|
| 2,897,181 | 7/1959 | Windenmuth ............... 260/77.5 AB |
| 2,933,462 | 4/1960 | Fischer ......................... 260/2.5 AB |
| 3,231,597 | 1/1966 | Fischer ......................... 260/77.5 AB |
| 3,291,660 | 12/1966 | Oberth et al. ................. 260/77.5 AB |
| 3,892,715 | 7/1975 | Bonin et al. .................. 260/77.5 AB |

FOREIGN PATENT DOCUMENTS

886186  1/1962  United Kingdom ............. 260/2.5 AB

*Primary Examiner*—H. S. Cockeram
*Attorney, Agent, or Firm*—J. D. Wolfe

[57] ABSTRACT

A process for preparing polyurethanes comprising reacting a polyol with an organic polyisocyanate in the presence of a catalytic amount of nickel acetylacetonate, wherein the polyol and nickel acetylacetonates are held at elevated temperatures prior to being mixed with the polyisocyanate.

3 Claims, No Drawings

METHOD OF MAKING POLYURETHANE UTILIZING NICKEL ACETYLACETONATE

This application is a continuation-in-part application of Ser. No. 724,890, now abandoned, filed Sept. 20, 1976.

This invention relates to methods for accelerating reactions of organic compounds having reactive groups of the formula —NCY, in which Y is oxygen or sulfur, with compounds having groups containing reactive hydrogen as determined by the Zerewitinoff method described in J. Am. Chem. Soc., Vol. 49, page 3181 (1927). These methods are generically useful in promoting reactions of isocyantes and isothiocyanates with a wide variety of active hydrogen-containing compounds and have found particular and immediate applicability in the preparation of polyurethanes, a broad class of organic polymers formed by reactions of di- or polyisocyanates or di- or polyisothiocyanates with a large variety of difunctional compounds having hydroxyl or amino groups containing active hydrogen, e.g., water, polyols, polyamines, polyethers, polyesters, polyoxycarboxy alkylenes and the like.

A very considerable number of materials have theretofore been proposed as catalysts for accelerating isocyanate reactions generally and polyurethane preparation in particular. One of the most important disadvantages that is common to all but a few of the catalysts known to have been proposed is that they do not accelerate the reaction sufficiently to bring it within the realm of practical utility. Tertiary amines, the most popular catalysts known to have been proposed heretofore, provides low reaction rates unless used in satisfactorily large amounts, typical formulations requiring one to three parts by weight of amine per 100 parts of total composition. Another very important disadvantage of proposed catalysts, including tertiary amines, is that they require elevated temperatures in reactions involving aromatic isocyanates and are essentially inactive in promoting reactions of aliphatic isocyanates at any reasonable temperature. Tertiary amines often impart an undesirable odor to reaction products of isocyanates with active hydrogen-containing compounds and, due to their basic characteristics, catalyze the degradation of the reaction products or polymers once they are formed. Cobalt naphthenate, another popular catalyst, has the disadvantage of imparting undesired color to the reaction product and of requiring a petroleum base solvent which leads to the formation of tacky foams of relatively high density. Strong bases such as sodium hydroxide, which provide greater acceleration, frequently lead to uncontrollable reactions, particularly in forming polyurethane foams, and bring about excess cross linking. Ferric acetylacetonate, a compound considered to be nonorganometallic because of the absence of any carbon to metal bond, is active but has the disadvantages of being colored and of being catalytically active in oxidative degradation of organic compounds.

Other disadvantages of heretofore proposed catalysts include discoloration, particularly yellowing on aging of the reaction products, poor control over the progress of the reaction and a tendency to require use of high temperatures to bring about a satisfactory rate of reaction.

Likewise, the metal organics such as tin, titanium, arsenic, copper, mercury compounds disclosed in U.S. Pat. Nos. 3,061,557; 3,084,177; 3,870,578 and 3,892,715 are taught to be catalysts for making polyurethanes but these metal organics have several deficiencies. They tend to produce reaction mixtures that have too short gelation time to produce uniform mixtures and the pot life is too short or too long. A further deficiency of the metal pentanediones are that they are generally heat unstable and may cause the organic isocyanate to polymerize or on standing at high temperatures, the catalyst become inactivated.

I have discovered that nickel pentanedione does not exhibit these deficiencies. For example, nickel acetylacetonates produce reaction mixtures having a gel time in excess of one minute, a tack-free time of at least seven minutes, a demold time of eight minutes and is stable at heat aging at 120° C. and the resulting polyurethanes have low extractables. Generally, the nickel acetylacetonate is utilized at 0.01 to 0.8 grams per 100 grams of polyol. Best cures are obtained at 0.02 to 0.4 grams of nickel acetylacetonate per 100 grams of polyol.

The reactants necessary for producing polyurethanes can be chosen, depending on the envisaged application, from any polyisocyanates and polyols usually employed in the preparation of polyurethanes. Generally, any simple aromatic, aliphatic or cycloaliphatic polyisocyanate possessing 2 or more functional groups can be used. Suitable examples include hexamethylene-diisocyanate, butylene-diisocyanate, toluylene-2,4- or 2,6-diisocyanate, p-phenylene-diisocyanate, cyclohexylene-1,4-diisocyanate, 4,4'-diisocyanato-dicyclohexylmethane, 4,4'-diisocyanato-diphenylmethane, 4,4'-diisocyanato-diphenylether and polyarylene polyisocyanates with more than two functional groups, obtained from aniline/formaldehyde condensation products. It is also possible to employ modified polyisocyanates produced by reacting an excess of a diisocyanate with a polyol of low molecular weight such as glycerine or trimethylolpropane. It is also possible to use a polyurethane prepolymer possessing terminal isocyanate groups, prepared beforehand by reacting an excess of polyisocyanate with a polyol. Furthermore, in certain cases, it is possible to add small amounts of a monoisocyanate.

As polyols, it is possible to use linear or branched polyols containing 2 or more functional groups. The choice of polyol obviously depends on the envisaged application. Thus, in order to produce elastomer products or flexible foams, long-chain linear polyols or polyols which are only branched to a slight extent, that is to say, polyols which have relatively long chains between the hydroxyl groups which are not very numerous, are used. When it is desired to produce hard moulded products or rigid foams, highly branched polyols of relatively low molecular weight should be used. Intermediate between these, semi-rigid or semi-flexible foams can be obtained by controlling the molecular weight and/or the degree of branching of the polyol. It is also possible to modify the properties of the polyols by adding a small amount of a monofunctional hydroxylic compound.

Suitable polyols of 2 to 4 hydroxyls or more include polyhydroxylic polyethers such as simple polyalkylene glycols like diethylene glycol and dipropylene glycol, polyethylene glycols and polypropylene glycols, polytetramethylene ether glycols and their copolymers. It is also possible to use polyhydroxylic polyethers produced by adding alkylene ethers to simple polyfunctional compounds containing hydroxyl, amine boxylic acid groups such as ethylene glycol, propylene glycol, glycerine, trimethylolpropane, 1,2,6-hexanetriol, butanediol, sucrose, glucose, sorbitol, pentaerythritol, mannitol, dulcitol, triethanolamine. N-methyl-dimethanol-amine, tartaric acid, malic acid and ricinoleic acid. It is also possible to employ polythioethers, such as those produced from thioglycol, as polyhydroxylic polyethers.

Polyhydroxylic polyesters are a class of polyols which are also frequently used. They can be produced by reacting one or more polycarboxylic acids with a suitable molar excess of one or more simple polyols. Amongst the polyacids, there may be mentioned aliphatic acids such as suberic acid and sebacic acid, cycloaliphatic acids such as cyclohexane-1,4-dicarboxylic acid, and aromatic acids such as ortho-, meta- and paraphthalic acids, 1,2-ethanediol, 1,2- and 1,3-propanediols, 1,2-, 1,3- and 1,4-butanediols, 1,6-hexanediol and 1,10-decanediol, glycerine, 1,2,6-hexanetriol, trimethylolpropane and pentaerythritol are illustrative.

It is also possible to employ $\alpha,\omega$-dihydroxylic polyester-amides, $\alpha,\omega$-dihydroxylic polyurethanes and $\alpha,\omega$-dihydroxylic hydrocarbons such as polybutadienes or $\alpha,\omega$-dihydroxylic butadiene/iso-butylene copolymers. Again, it is also possible to use optionally modified castor oil and the products of the etherification of silanols or siloxanes by polyethers or by polyhydroxylic polyesters.

Especially preferred polyols are those known as hydrocarbon polyols, including those having appreciable unsaturation. Generally, these are considered or viewed as hydroxyl containing polymers of dienes containing 4 to 12 carbons or their hydroxyl containing copolymers with a monoolefin having 2 to 20 carbons. These hydrocarbon polyols are available either commercially or experimentally as polybutadiene polyol, polyisoprene polyol, polystyrene/butadiene polyol, polybutadiene/acrylonitrile polyol with molecular weight ranges of about 1000 to 3000.

The proportions by weight of the polyol of about 500 to 6000 molecular weight to the polyisocyanate are not critical. These are chosen as a function of the envisaged application. In order to produce a polymer, the ratio is usually approximately 1, it is possible to prepare polyurethanes in which the end groups are either isocyanate groups or hydroxyl groups. When a prepolymer is prepared, the ratio of the number of isocyanate groups to the number of hydroxyl groups is normally greater than 1 and is generally between 1.05 and 3.

Any other catalyst usually employed in the urethanisation reaction can be added to the catalyst system of this invention. It is obvious, however, that any additional catalyst must not be too active in order that benefit of using the new system should not be lost. Tertiary amines can be employed as additional urethanisation catalysts.

The process according to the present invention can be used to prepare any type of polyurethane object. Depending on the desired type of object, it may be necessary or desirable to introduce, in addition to the main constituents, various additives well known to the specialist such as heat stabilisers and flameproofing agents, pore-forming agents, surface-active agents, ultra-violet absorbers, dyestuffs, pigments and fillers. The catalyst system used in the process of the present invention does not present any particular difficulties in the use of the various additives.

The process is particularly valuable for the manufacture of objects such as polyurethane foams, cushions, molded objects, pieces of furniture, imitation wood panels and soles for footwear, as well as solid industrial tires.

The nature of this invention can more readily be understood by reference to the following representative and illustrative examples where all parts and percentages are by weight unless otherwise designated.

EXAMPLE

One-tenth equivalent of a hydroxyl terminated butadiene styrene copolymer of 2000 to 3000 molecular weight (Arco Chemical Company's tradename CS-15 copolymer), 0.12 equivalents of propylene glycol and 0.519 grams of nickel acetylacetonate (0.034 g/100 grams of CS-15) were intimately mixed on a one-gallon Day Regal mixer to form a catalyst aliquot. Each catalyst aliquot was mixed with 22.0 grams of a commercial grade toluene diisocyanate (20/80 isomeric TDI mixture) and then gel time and demold time determined on the molded sample. The gel time was recorded as the time lapse from addition of TDI to the point where the polymer could no longer be stirred. The demold time was recorded as the time from the addition of TDI to the point at which the sample could be pulled from the mold, after press curing at 140° C. 5 minutes.

In the Table the catalyst aliquot was aged for the time and the temperature indicated before mixing in TDI and determining the gel time, the demold time and then the percent volume. Swell and the percent extractables were determined on the cured sample.

The data of the Table shows the nickel acetylacetonate catalyst is stable at high temperature against degradation and gives satisfactory gel and demold times, whereas the Ferric acetylacetonate degrades at these temperatures and is less active.

Table

| HEAT AGING STUDY USING NICKEL ACETYLACETONATE AS CATALYST | | | | | |
|---|---|---|---|---|---|
| Reaction Parameters | | | | Physicals on Vulcanizate | |
| Aging Conditions | | Gel Time Seconds | Demold Time Minutes | Volume Swell %[1] | Extractables %[1] |
| Time, Hours | Temp. ° C. | | | | |
| 0 | — | 70 | 5 | 403 | 4.3 |
| 24 | 120 | 65 | 5 | 380 | 3.5 |
| 48 | 120 | 75 | 5 | | |
| 168 | 25 | 70 | 5 | | |

[1]48 hours in benzene at room temperature.

Nickel acetylacetonate is unique among the coordination metal catalysts as it can be mixed with the polyol and be held at elevated temperatures for prolonged periods without deterioration of the catalyst. Hence, this system allows molded products to be made on a continuous basis even where the mixture is held at 100° C. for four hours or more.

While certain representative embodiments and details have been shown for the purpose of illustrating the invention, it will be apparent to those skilled in this art that various changes and modifications may be made therein without departing from the spirit or scope of the invention.

What is claimed is:

1. In a process for preparing molded polyurethanes consisting of reacting a catalyst-polyol mixture with an organic polyisocyanate wherein the catalyst-polyol mixture is held at an elevated temperature of 120° C. for prolonged periods, molding said polyurethane and demolding a cured article, the improvement of employing as the catalyst-polyol mixture 0.01 to 0.08 gram of nickel acetyl acetonate per 100 grams of polyol, wherein in said process the gelation time is in excess of one minute, the time required to obtain a tack-free surface is at least seven minutes, and the demolding time is eight minutes.

2. The process of claim 1 wherein the polyol is polyalkyldiene diol.

3. The process of claim 1 wherein the polyol is a hydroxylated copolymer of butadiene-styrene of a number average molecular weight of about 1000 to 3000.

* * * * *